Oct. 17, 1939.    E. A. HALL    2,176,071
COLLET CONSTRUCTION
Filed Jan. 18, 1938    2 Sheets-Sheet 1

INVENTOR.
ERNEST A. HALL
BY Bates, Golrick, & Teare
ATTORNEYS

Oct. 17, 1939.     E. A. HALL     2,176,071
COLLET CONSTRUCTION
Filed Jan. 18, 1938     2 Sheets-Sheet 2

INVENTOR.
ERNEST A. HALL
BY Bates, Goldrick, & Teare
ATTORNEYS

Patented Oct. 17, 1939

2,176,071

UNITED STATES PATENT OFFICE 2,176,071

COLLET CONSTRUCTION

Ernest A. Hall, Toledo, Ohio, assignor to The Hall Manufacturing Company, Toledo, Ohio, a corporation of Ohio Application January 18, 1938, Serial No. 185,559

2 Claims. (Cl. 279—54)

This invention relates to the improvement of collets. The type of collet with which this invention is concerned generally comprises a split tube or sleeve having tapering or conical ends or jaws, adapted to fit into a seat having a corresponding taper, so that a lengthwise movement of the collet toward the seat causes a contraction of the collet jaws and results in the gripping of a cylindrical work piece embraced by the collet.

One of the objects of the present invention is to provide a collet which will grip cylindrical articles, the diameters of which may vary considerably, one from another, such as motor valve stems, and by such gripping action center the article for rotation with a very high degree of accuracy.

A further object of the present invention is the provision of a double-ended collet, in which the work and seat contacting surfaces are so arranged relative to each other as to provide a very high degree of accuracy in the centering of the work.

Other objects of the present invention will become more apparent from the following description, which refers to the accompanying drawings. The essential features of the invention will be set forth in the claims.

Figure 2:
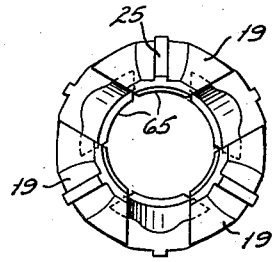
Figure 1:
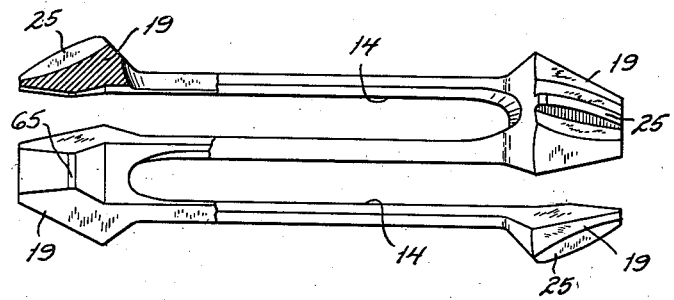
Figure 3:
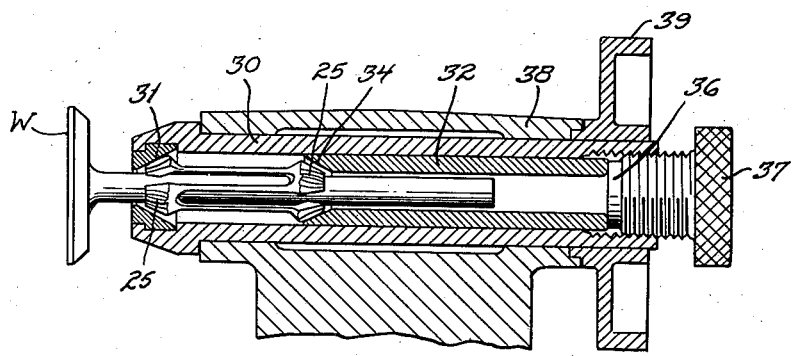
Figure 5:
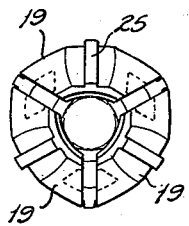
Figure 4:
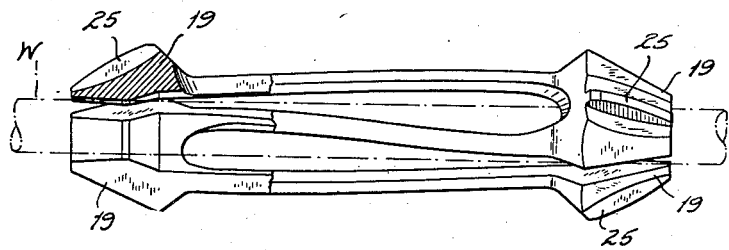
Figure 6:
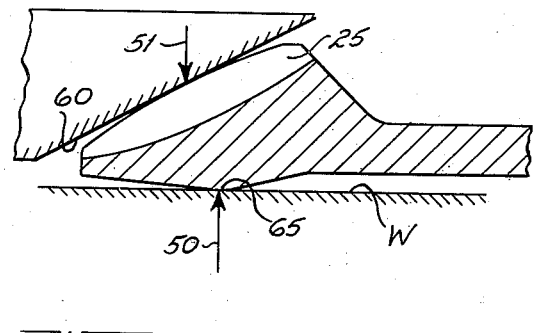
Figure 7:
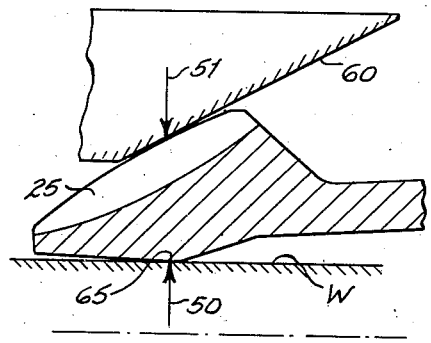
Figure 8:
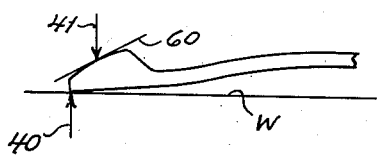
Figure 10:
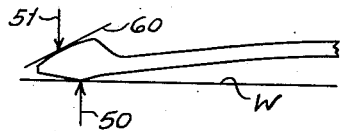
Figure 9:
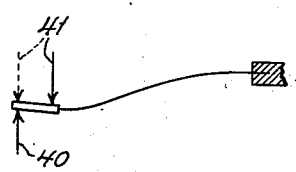
Figure 11:
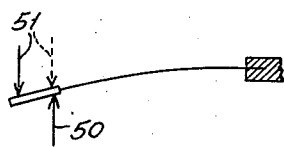

In the drawings, Fig. 1 is a side elevation of my improved collet, certain portions thereof being broken away to more clearly illustrate the invention; Fig. 2 is an end elevation of the collet; Fig. 3 is a sectional view, illustrating the collet in use; Fig. 4 is a view similar to Fig. 1, but illustrating the collet in a work-gripping position; Fig. 5 is an end elevation of a collet in its work-gripping position; Figs. 6 and 7 are diagrammatic, fragmentary, sectional details, illustrating the relationship between the seat and work contacting surfaces of the collet, Fig. 6 illustrating the gripping of a workpiece having a maximum diameter, and Fig. 7 illustrating gripping of a workpiece having a minimum diameter; Figs. 8 and 9 are diagrams illustrating the relationship between the work and seat contacting surfaces of the general form of collet now in use and Figs. 10 and 11 are diagrams similar to Figs. 8 and 9, but illustrating the relationship of the work and seat-contacting surfaces of my improved form of collet.

In the past, collets have been produced by cutting tubular bar stock to the required length, and slotting the resulting blanks longitudinally from opposite ends, so that alternate slots break through alternate ends of the blank, thereby providing a series of open-ended slots. The outer and internal surfaces of the ends or work gripping portions of the blank are then formed and the blank clamped in a mandrel in which the ends of the blank are confined, and while so confined the blank is hardened and tempered. The tempered blank is then removed from the mandrel, and the external and internal surfaces, namely the seat and work contacting surfaces, are ground to their finished dimensions. Such a collet and method of manufacture is disclosed, as for example, in Patent No. 1,716,331, issued to Byron F. Stowell, June 4th, 1929.

The area of the seat contacting surfaces is decreased, thus reducing the area of frictional contact between the collet and the seat, as well as to limit inaccuracies which might result from slight discrepancies in the contour of the seat and collet jaws. To this end, the ends of the collet are provided with narrow ribs 25 the external surfaces of which contact with the collet seats.

The use of the collet is best illustrated in Fig. 3. In this figure the collet is shown as slidably mounted in a suitable sleeve 30, which has a contracted conical inner end surface member 31, rigid therewith, which member coacts with the ribs 25 at one end of the collet. Slidably mounted in the sleeve 30 is a second sleeve 32, which has a conically formed inner surface 34, adapted to coact with the ribs 25 at that end of the collet. A suitable plunger 36, threadingly engaging the sleeve 30 urges the sleeve 32 against the collet, bringing the bevelled surfaces 31 and 34 together, thereby contracting the ends of the collet. The plunger 36 may be provided with any suitable means of rotation, such as, for instance, a hand wheel 37. The sleeve 30 is rotatably mounted in a carriage or spindle head 38, and is provided with a suitable pulley 39, by means of which the sleeve, with its associated collet and work piece W gripped thereby may be rotated.

In collets heretofore manufactured, the internal or work contacting surfaces have been ground to engage the work substantially at the end of the collet jaws. Hence as the collet is urged inwardly against its seat, the forces acting on the jaw of the collet act to cause the end of the collet to dig into the work as for instance at the point indicated by the arrow 40, in Fig. 8. It will also be noted that the seat contacts the jaw at a point spaced inwardly from the end of the collet, as for instance, that indicated by the arrow 41 in Fig. 8. This arrangement of opposing forces has a tendency to warp the collet in reversing directions of curvature, as illustrated in Fig. 9. Such warping of the collet brings out or into play any irregularities in the metallic structure of the piece and accentuates any inaccuracies that, despite the care in manufacture, may be present in the collet.

My improved form of collet, however, is so formed that the work-contacting area of the collet is, for all diameters of work, spaced inwardly from the end of the collet, as for instance, at the point indicated by the arrow 50 in Figs. 6 and 7. The arrangement of the collet jaw surfaces 25 relative to the surface 60 of the collet seat is such that as the collet is contracted from its maximum work-gripping diameter, as shown in Fig. 6, to its minimum work-gripping diameter, shown in Fig. 7, the point of contact between the seat and the rib 25 of the collet indicated by the arrow 51 is always between the end of the collet and the point indicated by the arrow 50, at which the collet contacts the work. Thus, as shown in Figs. 10 and 11, the collet is subjected to considerably less distortion than that type of collet diagrammatically illustrated in Figs. 8 and 9; indeed the forces eliminate all tendency of causing the collet to form a reversing curve, but rather tend to form a natural even curve.

I have also provided a collet wherein the relationship between the work contacting surface and the socket-contacting surfaces are so arranged that a minimum amount of distortion of the collet results when the collet is in work-gripping position. Thus, I have provided an extremely accurate collet which can be manufactured economically.

I claim:

1. A collet for use with a socket having a substantially conical internal seat, said collet comprising a tubular member having slots extending longitudinally therethrough from one end of the collet, each slot extending to a point a fixed distance from the other end of said collet, said collet having one end thereof bevelled to substantially correspond to said seat, and being provided with an internal work-engaging surface spaced inwardly from the end of the collet.

2. A collet for use with a socket having a substantially conical internal seat, said collet comprising a tubular member having slots extending longitudinally therethrough from at least one end of the collet forming a plurality of collet jaws at such end of the collet, each jaw being provided with an external seat-engaging surface adapted to coact with the conical seat and an internal work-engaging surface adapted to contact with the work, said work-engaging surface being spaced inwardly from the end of the collet a greater distance than that area of the collet which contacts the collet seat.

ERNEST A. HALL.